(12) United States Patent
Ishikawa

(10) Patent No.: US 12,012,720 B2
(45) Date of Patent: Jun. 18, 2024

(54) EXHAUST TREATMENT DEVICE FOR A CONSTRUCTION MACHINE

(71) Applicant: Yanmar Power Technology Co., Ltd., Osaka (JP)

(72) Inventor: Yoshihisa Ishikawa, Chikugo (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 382 days.

(21) Appl. No.: 17/440,537

(22) PCT Filed: Jan. 31, 2020

(86) PCT No.: PCT/JP2020/003674
§ 371 (c)(1),
(2) Date: Sep. 17, 2021

(87) PCT Pub. No.: WO2020/189050
PCT Pub. Date: Sep. 24, 2020

(65) Prior Publication Data
US 2022/0154422 A1    May 19, 2022

(30) Foreign Application Priority Data
Mar. 18, 2019 (JP) ................... 2019-049506

(51) Int. Cl.
*F01N 3/021* (2006.01)
*E02F 9/08* (2006.01)
(Continued)

(52) U.S. Cl.
CPC ........ *E02F 9/0866* (2013.01); *F01N 13/1805* (2013.01); *F01N 3/021* (2013.01); *F01N 3/2066* (2013.01); *F01N 2590/08* (2013.01)

(58) Field of Classification Search
CPC .... E02F 9/0866; F01N 13/1805; F01N 3/021; F01N 3/2066; F01N 2590/08; F01N 2250/02
See application file for complete search history.

(56) References Cited

U.S. PATENT DOCUMENTS 8,555,625 B2 * 10/2013 Trinkner ............. F01N 13/1822
60/311
8,893,481 B2 * 11/2014 Katou ..................... F01N 3/208
60/311
(Continued)

FOREIGN PATENT DOCUMENTS

JP    2011-157721 A    8/2011
JP    2015-183545 A    10/2015
(Continued)

OTHER PUBLICATIONS

International Search Report dated Apr. 7, 2020 issued in corresponding PCT Application PCT/JP2020/003674 cites the patent documents above.

*Primary Examiner* — Jason D Shanske
*Assistant Examiner* — James J Triggs
(74) *Attorney, Agent, or Firm* — NORTON ROSE FULBRIGHT US LLP

(57) ABSTRACT

A pivoting work vehicle includes an engine, an exhaust gas treatment apparatus, and a hood. The exhaust gas treatment apparatus is configured to treat exhaust gas from the engine. The hood is configured to cover the engine and the exhaust gas treatment apparatus. The exhaust gas treatment apparatus includes a DPF device and an SCR device. The exhaust gas is treated first by the DPF device, then by the SCR device. The DPF device and SCR device are each disposed so that the lengthwise directions thereof lie along the vertical (Continued)

direction. The DPF device and SCR device are arranged side-by-side in a direction orthogonal to the vertical direction.

10 Claims, 4 Drawing Sheets

(51) Int. Cl.
*F01N 13/18* (2010.01)
*F01N 3/20* (2006.01)

(56) References Cited

U.S. PATENT DOCUMENTS

| | | | | |
|---|---|---|---|---|
| 8,955,312 | B2* | 2/2015 | Watahiki | F01N 3/208 60/297 |
| 9,062,589 | B2* | 6/2015 | Katou | F01N 3/035 |
| 11,220,962 | B1* | 1/2022 | Fulton | F02D 13/0249 |
| 2006/0191247 | A1* | 8/2006 | Thaler | B01D 46/0013 55/523 |
| 2012/0266584 | A1* | 10/2012 | Chavannavar | F01N 3/106 60/274 |
| 2015/0211209 | A1* | 7/2015 | Okuda | F01N 3/035 180/309 |

FOREIGN PATENT DOCUMENTS

| | | | | |
|---|---|---|---|---|
| JP | 2015183545 A | * | 10/2015 | ........... B01D 46/001 |
| JP | 2016-176318 A | | 10/2016 | |
| JP | 2016-188645 A | | 11/2016 | |
| JP | 2017-029017 A | | 2/2017 | |
| WO | WO-2014006978 A1 | * | 1/2014 | ............. B60K 13/04 |

* cited by examiner

EXHAUST TREATMENT DEVICE FOR A CONSTRUCTION MACHINE

CROSS-REFERENCE TO RELATED APPLICATIONS

This application is a national stage application pursuant to 35 U.S.C. § 371 of International Application No. PCT/JP2020/003674, filed on Jan. 31, 2020 which claims priority under 35 U.S.C. § 119 to Japanese Patent Application No. 2019-049506 filed on Mar. 18, 2019, the disclosures of which are hereby incorporated by reference in their entireties.

TECHNICAL FIELD

The present invention relates to a construction machine.

BACKGROUND ART

There are conventionally known construction machines in which an exhaust gas treatment apparatus is provided for an engine. Patent Literatures 1 and 2 disclose this type of construction machine.

Patent Literature 1 discloses a rear small-pivoting construction machine. In the construction machine in Patent Literature 1, an exhaust gas treatment apparatus is provided in an engine chamber formed by part of a connecting wall of a rear peripheral wall that is a peripheral wall having substantially a semi-circular shape protruding toward the rear side. The exhaust gas treatment apparatus includes a first treatment unit and a second treatment unit. The first treatment unit and the second treatment unit are each provided such that the area thereof at the shortest distance from an inner wall of the connecting wall of the rear peripheral wall is positioned on a positioning line extending at a certain distance from the inner wall of the connecting wall of the rear peripheral wall.

Patent Literature 2 discloses a small-pivoting excavator. The small-pivoting excavator includes an upper pivoting body having a rear portion shaped like an arc. The upper pivoting body includes an exhaust gas treatment apparatus. The exhaust gas treatment apparatus is provided on the right side of an engine provided in the center of the rear portion of the upper pivoting body. The exhaust gas treatment apparatus is arranged at a tilt such that it is tilted with respect to the front-back direction of the upper pivoting body.

CITATION LIST

Patent Literature

Patent Literature 1: Japanese Unexamined Patent Application Publication No. 2011-157721
Patent Literature 2: Japanese Unexamined Patent Application Publication No. 2016-176318

DISCLOSURE OF INVENTION

Problems to be Solved by the Invention

In the configuration of Patent Literature 1 described above, the first treatment unit and the second treatment unit of the exhaust gas treatment apparatus are arranged in a lying position such that the respective longitudinal directions thereof are in the front-back direction. For this reason, relatively wide dead space is formed between the connecting wall of the rear peripheral wall and each of the outer wall of the first treatment unit extending along the longitudinal direction and the outer wall of the second treatment unit extending along the longitudinal direction. Therefore, the exhaust gas treatment apparatus is likely to be provided such that it occupies the space in the surroundings of the engine. Thus, it is far from the desirable maintainability of the engine.

Furthermore, in the configuration of Patent Literature 2, the exhaust gas treatment apparatus is arranged at a tilt such that it is tilted with respect to the front-back direction of the upper pivoting body. Here, the exhaust gas treatment apparatus is arranged in a lying position such that the longitudinal direction thereof is in a direction perpendicular to the vertical direction. Therefore, the exhaust gas treatment apparatus is likely to occupy the space in the surroundings of the engine and, as in Patent Literature 1, there is room for improvements in terms of the maintainability of the engine.

The present invention has been made in view of the above circumstances and has the object to improve the maintainability of the engine in the construction machine in which the exhaust gas treatment apparatus is provided for the engine.

Means for Solving the Problems

Effect of the Invention

The problems to be solved by the present invention are described above, and the means for solving the problem and the effect thereof are described next.

According to an aspect of the present invention, a construction machine having the following configuration is provided. Specifically, the construction machine includes an engine, an exhaust gas treatment apparatus, and a hood. The exhaust gas treatment apparatus treats an exhaust gas from the engine. The hood covers the engine and the exhaust gas treatment apparatus. The exhaust gas treatment apparatus includes a first treatment device and a second treatment device. The exhaust gas is treated by the first treatment device and then treated by the second treatment device. Each of the first treatment device and the second treatment device is provided such that a longitudinal direction thereof is in a vertical direction. The first treatment device and the second treatment device are arranged side by side in a direction perpendicular to the vertical direction.

This allows the first treatment device and the second treatment device of the exhaust gas treatment apparatus to be provided in a compact space in the hood. Accordingly, it is possible to prevent the exhaust gas treatment apparatus from occupying the space in the surroundings of the engine. Furthermore, as the engine and the exhaust gas treatment apparatus may be provided with the efficient use of the space, there may be unlikely to be dead space within the hood.

The above-described construction machine preferably has the following configuration. Specifically, a lower portion of the first treatment device is provided with a first treatment device inlet. An upper portion of the first treatment device is provided with a first treatment device outlet. A lower portion of the second treatment device is provided with a second treatment device inlet. An upper portion of the second treatment device is provided with a second treatment device outlet. The first treatment device outlet is coupled to the second treatment device inlet.

This allows, in the exhaust gas treatment apparatus, the exhaust gas discharged through the exhaust port of the engine to flow from the lower side to the upper side in each of the first treatment device and the second treatment device. Thus, based on the assumption that the exhaust gas that has been treated by the exhaust gas treatment apparatus is discharged from the upper portion, it is possible to ensure a path length necessary for treating the exhaust gas in each device and achieve a simple layout.

The above-described construction machine preferably has the following configuration. Specifically, the construction machine includes a hydraulic pump. The hydraulic pump is coupled to a drive shaft of the engine. The exhaust gas treatment apparatus is provided above the hydraulic pump inside the hood.

Thus, it is possible to achieve a layout that uses the space within the hood including the hydraulic pump more effectively.

DESCRIPTION OF EMBODIMENTS

Figure 1:
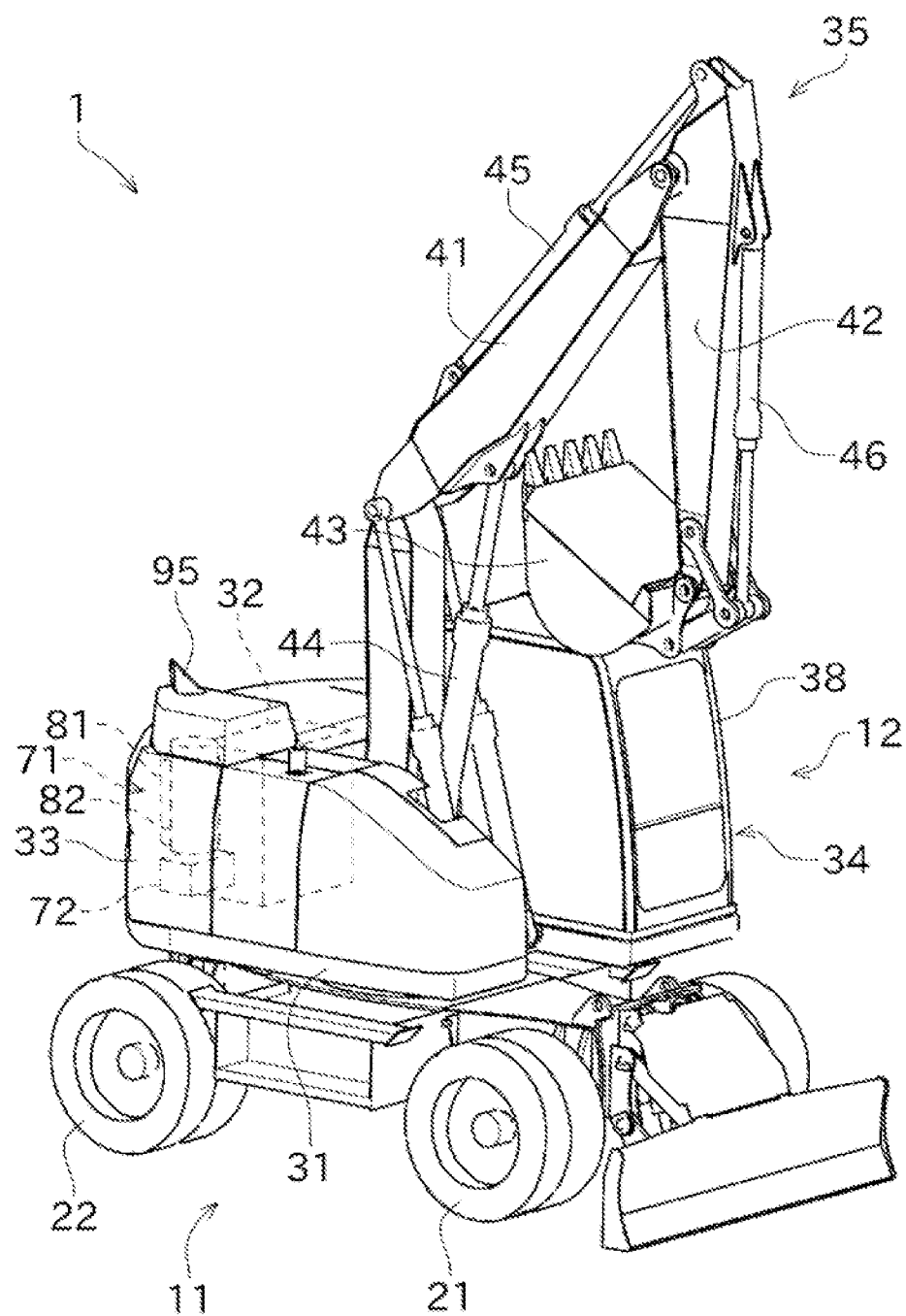
FIG. 1 is a perspective view illustrating an overall configuration of a pivoting work vehicle according to an embodiment of the present invention.

Next, an embodiment of the present invention is described with reference to the drawings. FIG. 1 is a perspective view illustrating an overall configuration of a pivoting work vehicle 1 according to an embodiment of the present invention.

The pivoting work vehicle (construction machine) 1 illustrated in FIG. 1 is a rear small-pivoting backhoe including a traveling unit 11 and a pivoting unit 12.

The traveling unit 11 includes a pair of front wheels 21 and rear wheels 22 on right and left. The traveling unit 11 drives the front wheels 21 and the rear wheels 22 on right and left so as to perform various types of traveling such as going straight forward or backward and pivoting.

The pivoting unit 12 includes a pivoting frame 31, an engine 32, a hood 33, a steering unit 34, and a work device 35.

The pivoting frame 31 is provided above the traveling unit 11 and is supported by the traveling unit 11 so as to rotate about a vertical axis. The pivoting frame 31 may rotate relative to the traveling unit 11 due to the driving of a pivoting motor.

The engine 32 is configured as, for example, a diesel engine. The engine 32 is provided at a rear portion of the pivoting unit 12. The engine 32 is supported by the pivoting frame 31.

The hood 33 covers components such as the engine 32. The hood 33 is provided above the pivoting frame 31. The hood 33 is arranged, on the pivoting frame 31, alongside a cabin 38 of the steering unit 34.

The steering unit 34 includes a driver's seat where an operator sits, various operating components, and the cabin 38 covering them. The operator operates the above-described operating components so as to give various instructions to the pivoting work vehicle 1. The steering unit 34 is provided at the left front of the pivoting unit 12.

When the positional relationship, and the like, of components attached to the pivoting unit 12 are described below, the front-back direction and the right-left direction are defined with the direction the operator sitting in the driver's seat faces as the front.

The work device 35 includes a boom 41, an arm 42, a bucket 43, a boom cylinder 44, an arm cylinder 45, and a bucket cylinder 46.

The boom 41 is configured as an elongated component, and the proximal end thereof is rotatably supported by a front portion of the pivoting frame 31. The boom cylinder 44 is attached to the boom 41 so that the boom 41 may be rotated due to expansion and contraction of the boom cylinder 44.

The arm 42 is configured as an elongated component, and the proximal end thereof is rotatably supported by the distal end of the boom 41. The arm cylinder 45 is attached to the arm 42 so that the arm 42 may be rotated due to expansion and contraction of the arm cylinder 45.

The bucket 43 is configured as a component formed like a container, and an end thereof is rotatably supported by the distal end of the arm 42. The bucket cylinder 46 is attached to the bucket 43 so that the bucket 43 may be rotated to perform a scooping/dumping operation due to expansion and contraction of the bucket cylinder 46.

Figure 2:
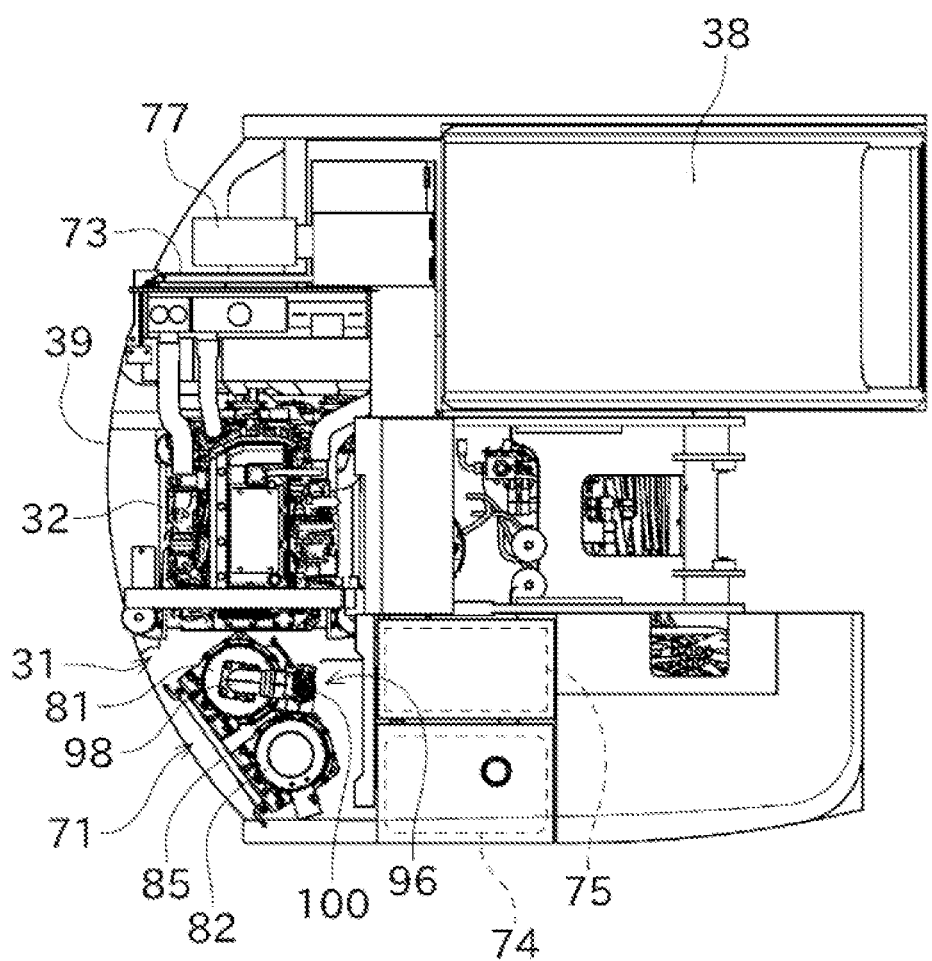
FIG. 2 is a plan view illustrating an inner configuration of a hood.
Figure 3:
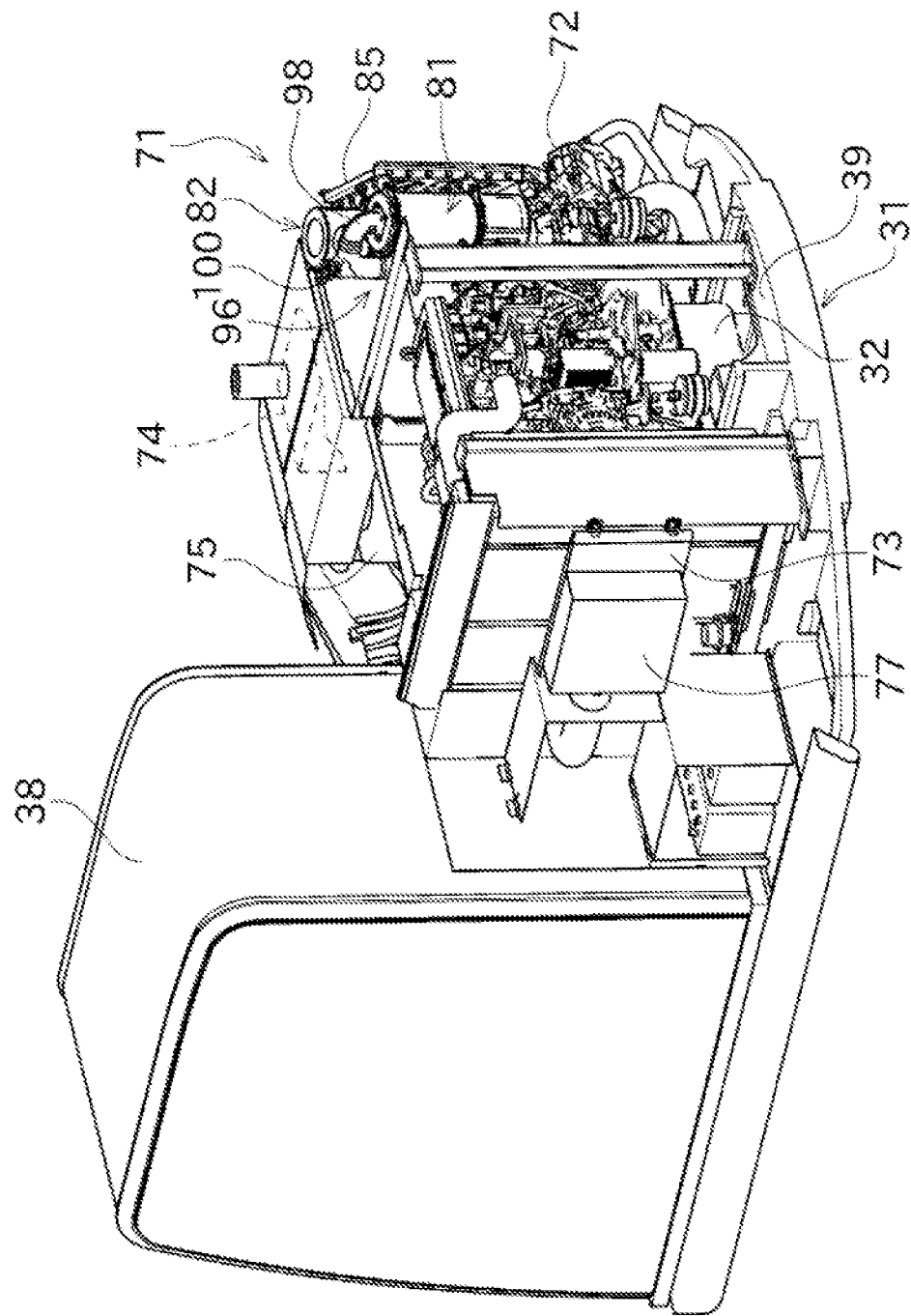
FIG. 3 is a perspective view illustrating an inner configuration of the hood.

Next, an inner configuration of the hood 33 is described. FIG. 2 is a plan view illustrating the inner configuration of the hood 33. FIG. 3 is a perspective view illustrating the inner configuration of the hood 33.

As illustrated in FIGS. 2 and 3, the rear portion of the pivoting frame 31 includes a curved portion 39 that protrudes to the rear side in a plan view. The hood 33 is provided above the pivoting frame 31 such that the rear portion thereof is curved so as to conform to the curved portion 39 of the pivoting frame 31.

The engine 32, an exhaust gas treatment apparatus 71, a hydraulic pump 72, an oil cooler 73, a fuel tank 74, a hydraulic oil tank 75, and the like, are provided inside the hood 33.

The engine 32 is provided at the rear center inside the hood 33. The engine 32 is opposed to a rear curved portion of the peripheral wall of the hood 33 which is located on the back side of the engine 32. The engine 32 includes an unillustrated drive shaft that is arranged horizontally in the right-left direction.

The exhaust gas treatment apparatus 71 treats the exhaust gas discharged from the engine 32. The exhaust gas treatment apparatus 71 is provided on the right side of the engine 32 on the pivoting frame 31. The exhaust gas treatment apparatus 71 is arranged substantially alongside the engine 32 in the right-left direction. Furthermore, the exhaust gas treatment apparatus 71 is provided above the hydraulic pump 72.

The hydraulic pump 72 supplies hydraulic oil to a hydraulic device such as a cylinder of the work device 35. The hydraulic pump 72 is mounted on the right side of an engine main body included in the engine 32. An input shaft of the hydraulic pump 72 is coupled in series to a drive shaft of the engine 32. Accordingly, intake and discharge of hydraulic oil by the hydraulic pump 72 are conducted in conjunction with the driving of the engine 32.

The hydraulic pump 72 is provided on the right side of the engine 32 on the pivoting frame 31. The hydraulic pump 72 is adjacent to the engine 32. Furthermore, the hydraulic pump 72 is provided in a space between the pivoting frame 31 and the exhaust gas treatment apparatus 71 (under the exhaust gas treatment apparatus 71) in the vertical direction.

Conversely, the exhaust gas treatment apparatus 71 is provided above the hydraulic pump 72.

The oil cooler 73 is provided on the left side of the engine 32. An air cleaner 77 is provided on the left side of the oil cooler.

The fuel tank 74 and the hydraulic oil tank 75 are provided at the right front of the engine 32 and in front of the exhaust gas treatment apparatus 71. The fuel tank 74 and the hydraulic oil tank 75 are arranged side by side in the right-left direction.

Figure 4:
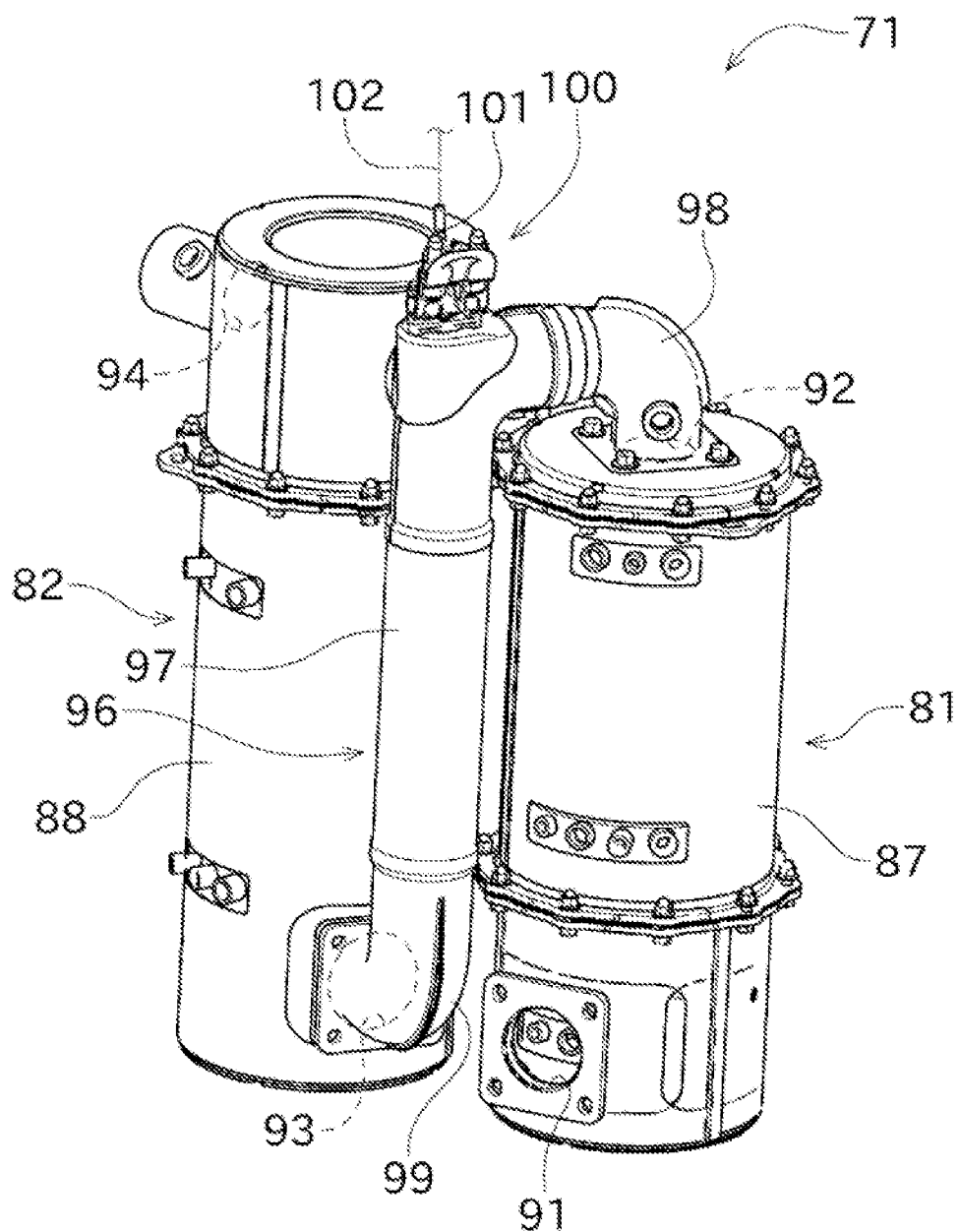
FIG. 4 is a perspective view illustrating a configuration of an exhaust gas treatment apparatus.

Next, the exhaust gas treatment apparatus 71 is described. FIG. 4 is a perspective view illustrating a configuration of the exhaust gas treatment apparatus 71.

As illustrated in FIG. 4, the exhaust gas treatment apparatus 71 includes a DPF device 81 that is a first treatment device and an SCR device 82 that is a second treatment device. DPF is the abbreviation for Diesel Particulate Filter. SCR is the abbreviation for Selective Catalytic Reduction.

As illustrated in FIGS. 2 and 3, the DPF device 81 and the SCR device 82 are arranged side by side with each other such that the respective longitudinal directions thereof are in the vertical direction (such that each of them is in an upright state). Both the DPF device 81 and the SCR device 82 are provided above the pivoting frame 31 and are supported by the pivoting frame 31 via a support member 85.

The DPF device 81 is provided near the curved portion 39 of the pivoting frame 31 and is opposed to the rear curved portion of the peripheral wall of the hood 33. The DPF device 81 is located at a position closer to the engine 32 than the SCR device 82 is.

The DPF device 81 may remove particulate matter (particulate matter, PM) contained in an exhaust gas. The DPF device 81 includes an oxidation catalyst, a filter, and a DPF chassis 87 housing them.

The oxidation catalyst is a catalyst including platinum, etc., to oxidize (burn) an unburnt fuel, carbon monoxide, nitric oxide, or the like, contained in the exhaust gas. The filter is configured as, for example, a wall-flow filter to collect particulate matter contained in the exhaust gas treated by the oxidation catalyst.

The DPF chassis 87 is a hollow member shaped like substantially a cylinder. The DPF chassis 87 is formed to be elongated in the axial direction of the cylinder. The DPF chassis 87 is provided at a position adjacent to the engine 32 such that the longitudinal direction thereof is in the vertical direction.

The shape of the DPF chassis 87 corresponds to the external shape of the DPF device 81. Therefore, the longitudinal direction of the DPF chassis 87 corresponds to the longitudinal direction of the DPF device 81. The longitudinal direction of the DPF device 81 is arranged to be in the vertical direction as is the case with the longitudinal direction of the DPF chassis 87.

The DPF device 81 is provided with a first inlet (first treatment device inlet) 91 and a first outlet (first treatment device outlet) 92. The first inlet 91 is provided in a lower portion of the DPF device 81. The first outlet 92 is provided in an upper portion of the DPF device 81. The first inlet 91 and the first outlet 92 are coupled to each other through an internal space of the DPF chassis 87. The exhaust gas enters the inside of the DPF chassis 87 through the first inlet 91 and discharges through the first outlet 92.

The first inlet 91 is provided on the lower side (one longitudinal end side) of the DPF chassis 87 oriented in the vertical direction so as to have an opening on the outer peripheral surface of the DPF chassis 87. The first outlet 92 is provided on the upper side (the other longitudinal end side) of the DPF chassis 87 so as to have an opening on the upper surface of the DPF chassis 87.

The first inlet 91 is coupled to an exhaust port of the engine 32 by the use of an appropriate pipe, or the like. The first outlet 92 is coupled to a second inlet 93 of the SCR device 82 by the use of a coupling pipe 96 described below.

The SCR device 82 is provided near the curved portion 39 of the pivoting frame 31 and is opposed to the rear curved portion of the peripheral wall of the hood 33. The SCR device 82 is located at a position farther from the engine 32 than the DPF device 81 is.

The SCR device 82 may remove NOx contained in the exhaust gas. The SCR device 82 includes an SCR catalyst, an ammonia oxidation catalyst, and an SCR chassis 88 housing them.

The SCR catalyst includes a material such as zeolite and ceramic that adsorbs ammonia. The ammonia oxidation catalyst is a catalyst that prevents ammonia that has been desorbed from the SCR catalyst or has not been adsorbed by the SCR catalyst from being released to the outside. The ammonia oxidation catalyst is an oxidation catalyst such as platinum that oxidizes ammonia to change ammonia into nitrogen, oxidic oxygen, water, etc., through oxidation.

The SCR chassis 88 is a hollow member shaped like substantially a cylinder. The SCR chassis 88 is formed to be elongated in the axial direction of the cylinder. The SCR chassis 88 is provided at a position adjacent to the DPF chassis 87 such that the longitudinal direction thereof is in the vertical direction.

The shape of the SCR chassis 88 corresponds to the external shape of the SCR device 82. Therefore, the longitudinal direction of the SCR chassis 88 corresponds to the longitudinal direction of the SCR device 82. The longitudinal direction of the SCR device 82 is arranged to be in the vertical direction as is the case with the longitudinal direction of the SCR chassis 88.

Both the DPF device 81 and the SCR device 82 are arranged in an upright position so as to extend in the vertical direction. Accordingly, the longitudinal directions of the DPF device 81 and the SCR device 82 are parallel to each other. The DPF device 81 and the SCR device 82 are arranged side by side at an appropriate (small) space in the direction perpendicular to the respective extending directions (longitudinal directions). Specifically, the SCR device 82 is located at the right front (diagonally front) of the DPF device 81. When viewed along the direction in which the DPF device 81 and the SCR device 82 are lined up, the DPF device 81 and the SCR device 82 have portions overlapped with each other. Thus, the exhaust gas treatment apparatus 71 may be compact in size in the vertical direction.

The SCR device 82 is provided with the second inlet (second treatment device inlet) 93 and a second outlet (second treatment device outlet) 94. The second inlet 93 is provided in a lower portion of the SCR device 82. The second outlet 94 is provided in an upper portion of the SCR device 82. The second inlet 93 and the second outlet 94 are coupled to each other through an inner space of the SCR chassis 88. The exhaust gas enters the inside of the SCR chassis 88 through the second inlet 93 and discharges through the second outlet 94.

The second inlet 93 is coupled to the first outlet 92 of the DPF device 81 via the coupling pipe 96. The second outlet 94 is coupled to an outlet pipe 95 illustrated in FIG. 1. The outlet pipe 95 allows the exhaust gas treated by the exhaust gas treatment apparatus 71 to escape to the space outside the hood 33. An opening of the outlet pipe 95 formed on the outside of the hood 33 faces a direction away from the steering unit 34.

The second inlet 93 is provided on the lower side (one longitudinal end side) of the SCR chassis 88 oriented in the vertical direction so as to have an opening toward the side of the SCR chassis 88. The second outlet 94 is provided on the upper side (the other longitudinal end side) of the SCR chassis 88 so as to have an opening toward the side of the SCR chassis 88.

The coupling pipe 96 includes a straight portion 97, a first coupling end 98, and a second coupling end 99.

The straight portion 97 is formed in the middle of the path for the exhaust gas in the coupling pipe 96. The straight portion 97 is formed to extend in a straight line in a direction (vertical direction) parallel to the DPF chassis 87 and the SCR chassis 88.

The first coupling end 98 is coupled at right angle to the straight portion 97 at one longitudinal end of the straight portion 97. The first coupling end 98 is bent as appropriate to be coupled to the first outlet 92 formed on the upper surface of the DPF device 81.

The second coupling end 99 is coupled at right angle to the straight portion 97 at the end on the opposite side of the first coupling end 98 in the longitudinal direction of the straight portion 97. The second coupling end 99 is coupled to the second inlet 93 of the SCR device 82.

The coupling pipe 96 includes an aqueous urea solution injection unit 100. The aqueous urea solution injection unit 100 is provided near the area where the first coupling end 98 is coupled to the straight portion 97. The aqueous urea solution injection unit 100 may inject an aqueous urea solution to the exhaust gas flowing through the coupling pipe 96.

The aqueous urea solution is injected, from the upper side, to the exhaust gas flowing from the upper side to the lower side in the straight portion 97 of the coupling pipe 96. In the path for the exhaust gas flowing linearly, the aqueous urea solution is injected in the direction along the path so that the urea is hydrolyzed desirably so as to efficiently produce ammonia necessary for NOx reduction treatment.

The aqueous urea solution injection unit 100 includes an aqueous urea solution injection nozzle 101 that injects an aqueous urea solution, an aqueous urea solution injection tube 102, and an aqueous urea solution pump. The aqueous urea solution injection nozzle 101 is provided at the top of the coupling pipe 96.

The aqueous urea solution pump draws the aqueous urea solution from an unillustrated aqueous urea solution tank and delivers it to the aqueous urea solution injection nozzle 101 via the aqueous urea solution injection tube 102. Although the aqueous urea solution tank may be provided at any position in the pivoting unit 12, it is considered that it is provided in, for example, a space under the exhaust gas treatment apparatus 71.

With this configuration, the exhaust gas discharged from the engine 32 is delivered to the exhaust gas treatment apparatus 71 and then discharged to the outside of the hood 33. In the exhaust gas treatment apparatus 71, the exhaust gas is first treated by the DPF device 81 and then treated by the SCR device 82.

Specifically, after the exhaust gas is discharged through the exhaust port of the engine 32, it is introduced into the DPF chassis 87 of the DPF device 81 through the first inlet 91. After the exhaust gas is introduced into the DPF chassis 87, it flows from the lower side to the upper side of the DPF chassis 87 while it is treated by the oxidation catalyst and the filter, and it is discharged to the coupling pipe 96 through the first outlet 92.

Then, the exhaust gas flows from the upper side to the lower side from the first outlet 92 of the DPF device 81 toward the second inlet 93 of the SCR device 82 through the coupling pipe 96. At this point, the aqueous urea solution injection unit 100 injects an aqueous urea solution to the exhaust gas in the coupling pipe 96. Accordingly, the urea is hydrolyzed to produce ammonia. The exhaust gas containing ammonia is introduced from the coupling pipe 96 into the SCR chassis 88 of the SCR device 82 through the second inlet 93.

After the exhaust gas containing ammonia is introduced into the SCR chassis 88, it flows from the lower side of the SCR chassis 88 to the upper side thereof while it is treated by the SCR catalyst and the ammonia oxidation catalyst, and it is discharged to the outside through the second outlet 94.

In the SCR chassis 88, ammonia in the exhaust gas is adsorbed by the SCR catalyst. NOx contained in the exhaust gas is brought into contact with the SCR catalyst having adsorbed ammonia to be reduced and changed into nitrogen and water. Ammonia that has been desorbed from the SCR catalyst or has not been adsorbed by the SCR catalyst is oxidized by the ammonia oxidation catalyst to be changed to nitrogen, oxidic oxygen, water, etc.

According to the present embodiment, the exhaust gas treatment apparatus 71 is provided on the side (right side) of the engine 32 such that the DPF device 81 and the SCR device 82 are oriented in the vertical direction and are lined up in the horizontal direction. Thus, as the exhaust gas treatment apparatus 71 may be provided slightly apart from the engine 32, a wide space for maintenance may be provided in the surroundings (in particular, on the upper side) of the engine 32. In particular, according to the present embodiment, as the engine 32 is accessed from above to perform maintenance for the engine 32, it is particularly advantageous to provide the exhaust gas treatment apparatus 71 as described above.

Furthermore, both the DPF device 81 and the SCR device 82 included in the exhaust gas treatment apparatus 71 are located close to the rear curved portion of the peripheral wall of the hood 33. Therefore, the compact placement of the exhaust gas treatment apparatus 71 at the end of the inner space of the hood 33 may cause less dead space and achieve the effective use of the space. As a result, it is easy to ensure a large capacity of, for example, the hydraulic oil tank 75 and the fuel tank 74.

In particular, according to the present embodiment, the exhaust gas treatment apparatus 71 is supported above the hydraulic pump 72. Therefore, it is possible to achieve a layout that uses the space within the hood 33 more effectively. For example, relevant parts (such as the component for supplying the aqueous urea solution) of the exhaust gas treatment apparatus 71 as well as the hydraulic pump 72 may be provided in a space under the exhaust gas treatment apparatus 71.

The exhaust gas is supplied to the lower portion of the DPF device 81, flows upwardly, and is discharged from the upper portion of the DPF device 81. Then, the exhaust gas flows downward through the coupling pipe 96 and is supplied to the lower portion of the SCR device 82. The exhaust gas then flows upward through the SCR device 82 and is discharged from the upper portion of the SCR device 82. In this manner, the exhaust gas flows from the bottom to the top through each of the DPF device 81 and the SCR device 82 in the process of passing through the U-turn path twice in the vertical direction. Thus, it is possible to achieve the compact configuration of the entire exhaust gas treatment apparatus 71 while ensuring a sufficient path length necessary for effectively treating the exhaust gas in each device. Furthermore, as the aqueous urea solution is added to the exhaust gas flowing from the top to the bottom in the coupling pipe 96, a sufficient path length for generating ammonia may be ensured. As the exhaust gas is finally discharged from the upper portion of the exhaust gas treatment apparatus 71, it is possible to make an easy adaptation to the layout in which the opening of the outlet pipe 95 is provided above the hood 33 as in the pivoting work vehicle 1 according to the present embodiment.

As described above, the pivoting work vehicle 1 according to the present embodiment includes the engine 32, the exhaust gas treatment apparatus 71, and the hood 33. The exhaust gas treatment apparatus 71 treats the exhaust gas from the engine 32. The hood 33 covers the engine 32 and the exhaust gas treatment apparatus 71. The exhaust gas treatment apparatus 71 includes the DPF device 81 and the SCR device 82. The exhaust gas is treated by the DPF device 81 and then treated by the SCR device 82. Each of the DPF device 81 and the SCR device 82 is provided such that the longitudinal direction thereof is in the vertical direction. The DPF device 81 and the SCR device 82 are arranged side by side in a direction perpendicular to the vertical direction.

This allows the DPF device 81 and the SCR device 82 of the exhaust gas treatment apparatus 71 to be provided in a compact space within the hood 33. Thus, the exhaust gas treatment apparatus 71 may be prevented from occupying the space in the surroundings of the engine 32. As the engine 32 and the exhaust gas treatment apparatus 71 may be provided with the efficient use of the space, there is unlikely to be dead space within the hood 33.

Furthermore, in the pivoting work vehicle 1 according to the present embodiment, the lower portion of the DPF device 81 is provided with the first inlet 91. The upper portion of the DPF device 81 is provided with the first outlet 92. The lower portion of the SCR device 82 is provided with the second inlet 93. The upper portion of the SCR device 82 is provided with the second outlet 94. The first outlet 92 is coupled to the second inlet 93.

Accordingly, in the exhaust gas treatment apparatus 71, the exhaust gas discharged through the exhaust port of the engine 32 may flow from the lower side to the upper side in each of the DPF device 81 and the SCR device 82. Thus, based on the assumption that the exhaust gas that has been treated by the exhaust gas treatment apparatus 71 is discharged from the upper portion, it is possible to ensure a path length necessary for treating the exhaust gas in each device and achieve a simple layout.

Furthermore, the pivoting work vehicle 1 according to the present embodiment includes the hydraulic pump 72. The input shaft of the hydraulic pump 72 is arranged coaxially with the drive shaft of the engine 32 to rotate together. The exhaust gas treatment apparatus 71 is provided above the hydraulic pump 72 inside the hood 33.

Accordingly, when the drive shaft of the engine 32 is arranged horizontally, the exhaust gas treatment apparatus 71 is provided above the hydraulic pump 72 attached to the end of the drive shaft and therefore the space above the engine 32 is not covered by the exhaust gas treatment apparatus 71. Thus, it is easy to perform maintenance for the engine 32 from the upper side.

Although the preferred embodiment of the present invention is described above, the above-described configuration may be changed as described below, for example.

The direction in which the DPF device 81 and the SCR device 82 are lined up may be not only a diagonal direction but also, for example, a front-back direction or a right-left direction.

The first inlet 91 may be provided on a lower surface of the DPF device 81. The first outlet 92 may be provided on an outer circumference surface of the upper portion of the DPF device 81.

The second inlet 93 may be provided on a lower surface of the SCR device 82. The second outlet 94 may be provided on an upper surface of the SCR device 82.

The coupling pipe 96 coupling the DPF device 81 and the SCR device 82 does not necessarily have the shape illustrated in FIG. 4, or the like, and may be changed as appropriate.

In consideration of the above-described knowledge, it is clear that the present invention may include many changed forms and modified forms. Therefore, it should be understood that the present invention may be implemented in a manner other than that described in this description within the scope of the appended claims.

DESCRIPTION OF REFERENCE NUMERALS

1 Pivoting work vehicle (construction machine)
32 Engine
33 Hood
71 Exhaust gas treatment apparatus
72 Hydraulic pump
81 DPF device (first treatment device)
82 SCR device (second treatment device)
91 First inlet (first treatment device inlet)
92 First outlet (first treatment device outlet)
93 Second inlet (second treatment device inlet)
94 Second outlet (second treatment device outlet)

The invention claimed is:
1. A construction machine comprising:
an engine;
an exhaust gas treatment apparatus configured to treat an exhaust gas from the engine; and
a hood configured to cover the engine and the exhaust gas treatment apparatus,
wherein:
the exhaust gas treatment apparatus includes a first treatment device and a second treatment device,
the exhaust gas is treated by the first treatment device and then treated by the second treatment device,
each of the first treatment device and the second treatment device is provided such that a longitudinal direction thereof is in a vertical direction, and
the first treatment device and the second treatment device are arranged side by side in a direction perpendicular to the vertical direction, and
the first treatment device and the second treatment device are opposed to a rear curved portion of a peripheral wall of the hood.
2. The construction machine according to claim 1, wherein:
a lower portion of the first treatment device is provided with a first treatment device inlet,
an upper portion of the first treatment device is provided with a first treatment device outlet,
a lower portion of the second treatment device is provided with a second treatment device inlet,
an upper portion of the second treatment device is provided with a second treatment device outlet, and the first treatment device outlet is coupled to the second treatment device inlet.

3. The construction machine according to claim 2, further comprising:

a hydraulic pump, and wherein:

an input shaft of the hydraulic pump is arranged coaxially with a drive shaft of the engine to rotate together, and the exhaust gas treatment apparatus is provided above the hydraulic pump inside the hood.

4. The construction machine according to claim 1, further comprising a hydraulic pump.

5. The construction machine according to claim 4, wherein an input shaft of the hydraulic pump is arranged coaxially with a drive shaft of the engine to rotate together.

6. The construction machine according to claim 5, wherein the exhaust gas treatment apparatus is provided above the hydraulic pump inside the hood.

7. The construction machine according to claim 1, wherein the engine is opposed to the rear curved portion of the peripheral wall of the hood.

8. The construction machine according to claim 1, wherein the first treatment device is interposed between the engine and the second treatment device.

9. The construction machine according to claim 1, wherein each of the first treatment device and the second treatment device is coupled to a support member.

10. The construction machine according to claim 9, wherein, when the hood is in a closed position, the support member is positioned between the rear curved portion of the peripheral wall of the hood and each of the first treatment device and the second treatment device.

\* \* \* \* \*